Patented Jan. 30, 1951

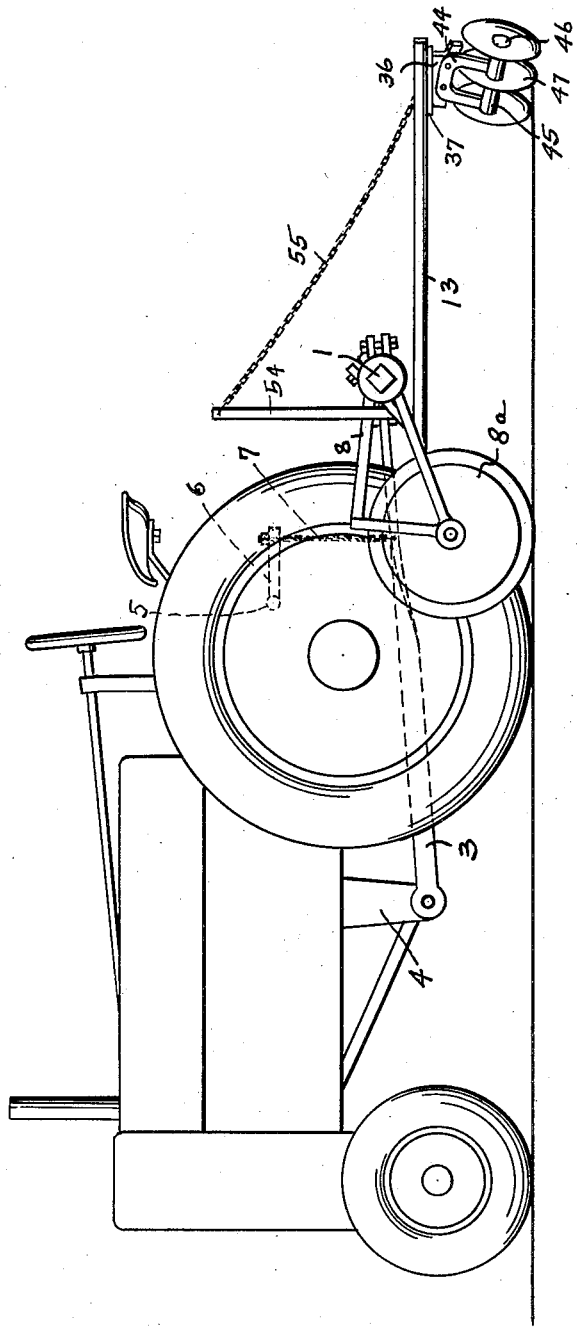

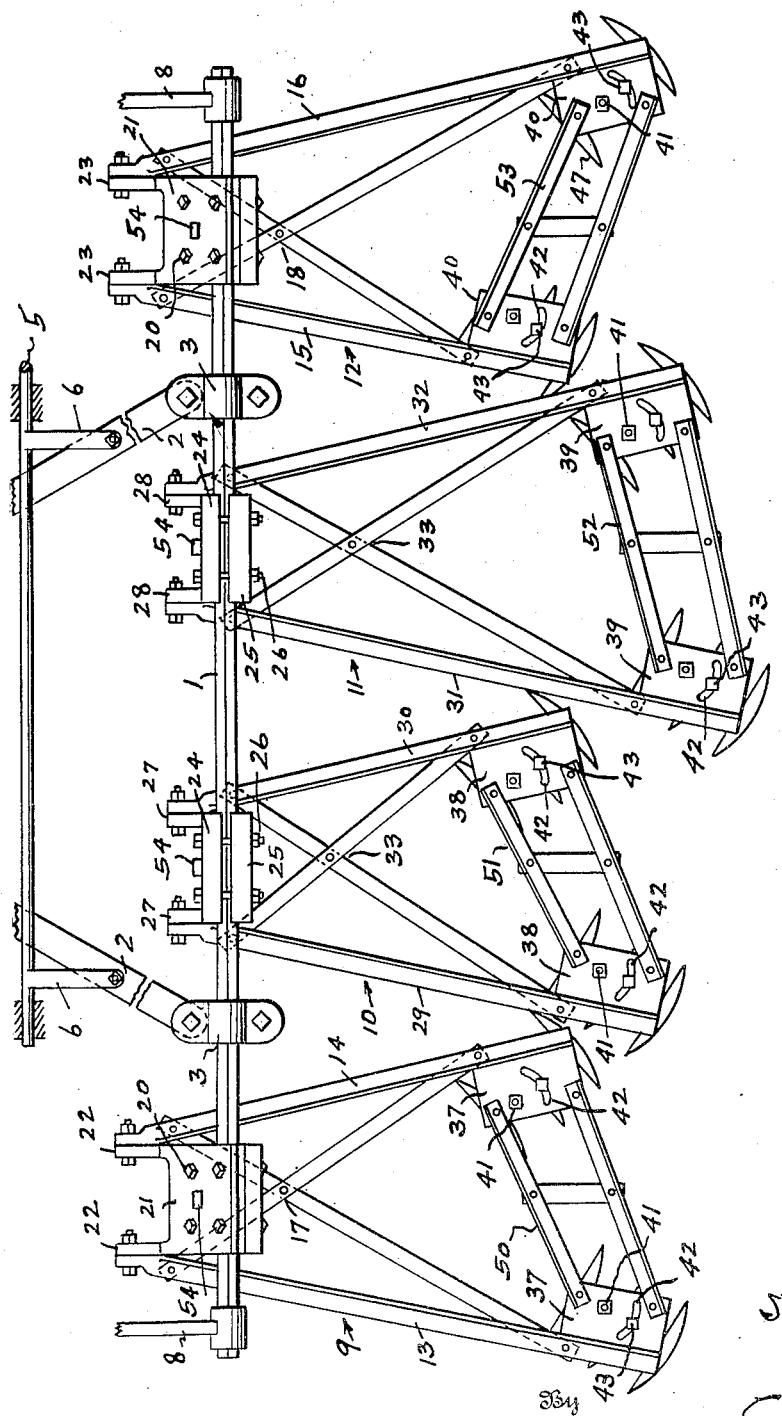

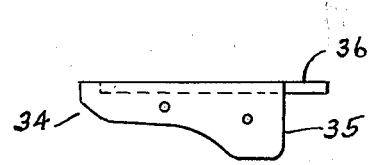
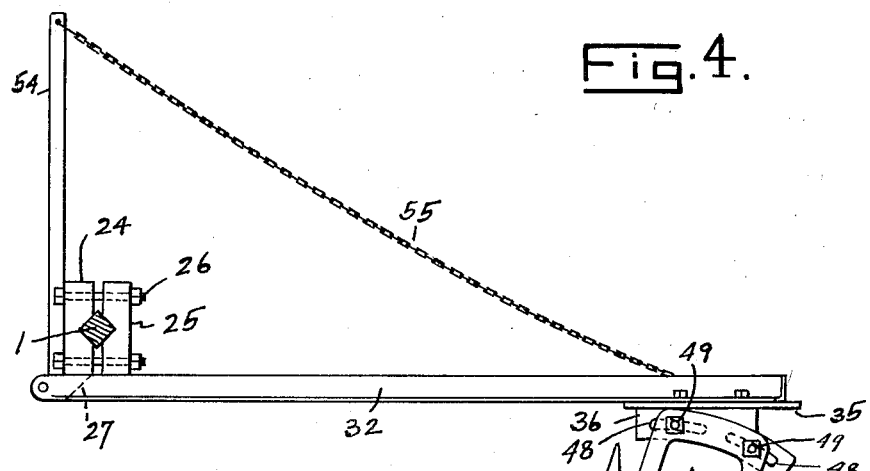
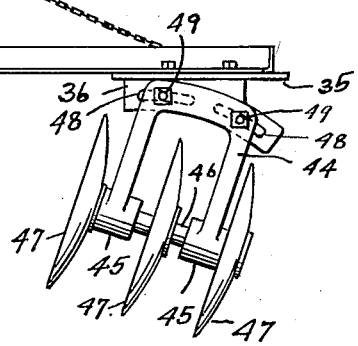
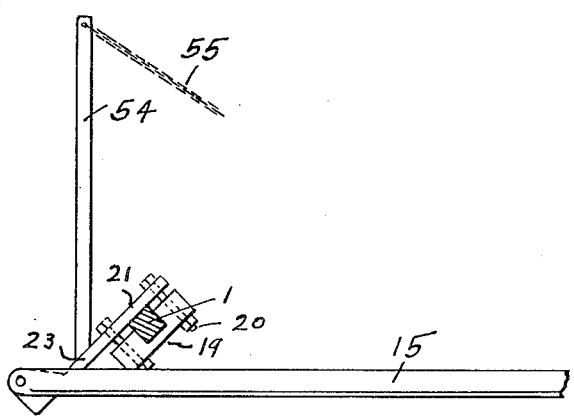

2,539,632

UNITED STATES PATENT OFFICE 2,539,632

TRACTOR MOUNTED DISK CULTIVATOR

Samuel J. Miller, Corpus Christi, Tex.

Application May 29, 1945, Serial No. 596,521

7 Claims. (Cl. 97—54)

This invention relates to a tractor operated disc cultivator.

An object of the invention is to provide an agricultural implement of the character described specially designed for pulverizing earth that has previously been plowed, either in preparation for planting, in some cases, or for cultivation purposes.

Another object of the invention is to provide a harrow of the character described which has been particularly designed for pulverizing the earth that has been previously thrown up in beds, or rows; or the harrow may be used for forming the plowed earth into beds in preparation for planting.

It is a further object of the invention to provide, in a harrow of the character described, a plurality of gangs of discs mounted on a tractor in a novel manner so that they may be readily elevated or lowered.

It is a further object of the invention to provide, in a harrow, a novel construction for mounting each gang of discs whereby the same may be adjusted about a vertical axis or about a horizontal axis.

Further advantages as to construction and use will be detailed in the following specification and illustrated by the accompanying drawings, wherein:

Figure 1 is a side view of the harrow shown connected to a tractor.

Figure 2 is an enlarged, fragmentary, plan view.

Figure 3 is a fragmentary, side elevation.

Figure 4 is a top, plan view of an anchor employed; and

Figure 5 is a fragmentary, side elevation of the harrow.

Referring now more particularly to the drawings wherein like numerals of reference designate the same parts in each of the figures, the numeral 1 designates a transverse bar to which the side members 2, 2 of an A-frame are connected by means of the clamps 3, 3, which are clamped to said bar 1. These side members 3, 3 converge forwardly and are pivotally connected to the tractor hanger 4 so as to pivot on a transverse axis whereby the bar 1 may be moved up and down.

Mounted in suitable bearings on the tractor there is a transverse shaft 5 having the rearwardly extended rigid arms 6, 6 connected thereto and depending from the free ends of these arms are the chains 7, 7 which are connected to the side members 2, 2. By suitably rotating the shaft 5 in one direction the side members 2, 2 of the frame may be elevated and when rotated in the other direction said frame may be lowered. The rotation of the shaft 5 is under the control of the operator by suitable mechanism mounted on the tractor.

Anchored to the ends of the bar 1 and extending forwardly therefrom are the frames 8, 8, each frame 8 having rotatably mounted thereon a ground wheel as 8a which holds the bar 1 at a selected elevation above the ground surface while the harrow is in operation.

As illustrated in Figure 2 there are a plurality of disc units, four being shown in the illustration, although a greater or less number may be used if desired. These disc units are pivotally mounted relative to the bar 1. These units are designated, as a whole, by the numerals 9, 10, 11 and 12. The end units 9 and 12 have the rearwardly diverging side bars 13, 14 and 15, 16, respectively, which are braced by the cross braces 17, 18 whose ends are secured to said respective side bars. Clamped to the bar 1 by the clamp 19 and the clamp bolts 20 are the plates 21, 21 having the forwardly directed pairs of arms 22, 22 and 23, 23 to which the forward ends of the side members of the frames 9 and 12 are pivoted on a horizontal axis. It will be noted that these pivotal points are an appreciable distance in front of the bar 1 and the corresponding frames 9 and 12 extend rearwardly underneath the bar 1.

The intermediate plates 24 are clamped to the bar 1 by means of the clamp 25 and clamp bolts 26 and the lower ends of the plates 25 have the spaced, forwardly turned ears 27, 27 and 28, 28 to which the corresponding side members 29, 30 of the frame 10 and 31, 32 of the frame 11 are pivoted on horizontal axis. These frames 10 and 11 extend rearwardly underneath the bar 1. The frames 10 and 11 are braced by the cross braces 33, 33 whose ends are anchored to said respective side members.

Fastened to the rear ends of the respective side members of the frames are anchors such as 34 of a special type.

This anchor is shown in detail in Figure 4 and is of substantially angular shape having the top plate 35 and the vertical plate 36. Secured to the rear ends of the side bars of the respective disc units are similar anchor plates, the plates of the unit 9 being designated by the numerals 37, 37, the plates of the unit 10 being designated by the numerals 38, 38, the plates of the unit 11 being designated by the numerals 39, 39, and the plates of the unit 12 being designated by the numerals 40, 40. The plates of the respective units extend inwardly toward each other, as shown in Figure 2. The anchors 34 are fastened to the underside of the respective plates. The top plate 35 of each anchor is fitted closely against the underside of the corresponding anchor plate 37, 38, 39, or 40, as the case may be, and is clamped to said anchor plate by a clamp bolt such as 41. Each anchor plate has an arcuate slot 42 thereto and a clamp bolt as 43 is fitted through each slot and is screwed into the anchor beneath with its head clamped against the corresponding anchor plate.

Fastened to the plate 36 of each anchor 34 are the inverted U-shaped yokes 44, the free ends of whose side arms have the bearings 45, 45 thereon in which the axle 46 is mounted to rotate and fixed on these axles 46 are the concavo-convex discs 47 having sharp cutting edges. Each plate 36 has the oblong arcuate slots 48, 48 and clamp bolts 49 are fitted through the cross bar of each yoke and through the slots 48 and by means of which the yoke may be clamped to the plate 36.

Therefore two gangs of concavo-convex cutting discs depend from each of the units 9, 10, 11 and 12. By loosening the clamp bolt 43 the corresponding gang of discs may be adjusted about a vertical axis and said clamp bolt then tightened to hold said gang at said point of adjustment. Also each gang of discs can be adjusted about a horizontal axis by loosening the clamp bolts 49 and making the adjustment and then again tightening said bolts.

It will be noted from an inspection of Figure 1 that the concave sides of the discs face forwardly and it is to be further noted that the discs of the two gangs of each disc unit face forwardly on converging lines so that the discs of any particular disc unit will throw the loose dirt inwardly with respect to the line of travel of said unit so as to form the earth into ridges, or beds, or so as to follow the contour of said ridges, or beds, if previously formed.

The anchor plates 37, 37; 38, 38; 39, 39, and 40, 40 of the respective disc units are connected by the H-frames 50, 51, 52 and 53 for strength, as shown in Figure 2.

Fastened to the plates 21 and 24 and upstanding therefrom are the standards 54, 54. There are the chains 55 whose forward ends are connected to the upper ends of the standards 54 and whose rear ends are connected to the corresponding H-frames 50, 51, 52 and 53. These chains are of sufficient length so that they will be slack while the harrow discs are working in contact with the ground surface but when the transverse bar 1 is lifted, by the manipulation of the shaft 5, as hereinabove explained, these chains 55 will eventually become taut and will lift the disc units so that the discs will clear the ground surface when the end of a row has been reached and it is desired to turn the harrow around or when it is desired to transport the harrow from place to place.

The drawings and description are illustrative merely while the broad principle of the invention will be defined by the appended claims.

What I claim is:

1. In a harrow, a transverse supporting bar, a frame whose forward end is pivotally connected to a tractor and on the rear end of which said bar is mounted, an end frame rigidly secured to each end of the bar and extended forwardly, a ground wheel on the forward end of each end frame, disc units pivoted to, and extending rearwardly from, said bar and a plurality of gangs of discs mounted on each unit.

2. In a harrow, a frame whose forward end is adapted to be connected to a tractor, a transverse bar supported on said frame, an end frame rigidly secured to each end of the bar and extended forwardly, a ground wheel on the forward end of each end frame, disc units pivoted to and extending rearwardly from said bar, a gang of rotatable discs on each unit, flexible members connected, at their rear ends, to said disc units and means connecting the forward and of said flexible members to the bar whereby the disc units will be lifted when the bar is elevated.

3. In a harrow, a disc unit frame, an anchor plate secured to the frame, an anchor secured underneath said plate and adjustable about an approximately vertical axis, a U-shaped frame on said anchor and adjustable about an approximately horizontal axis, a gang of discs rotatably mounted on said last mentioned frame, means for connecting said unit to a tractor, said unit being connected to said connecting means to pivot about an approximately horizontal axis.

4. In a harrow, a transverse bar, means connected to the bar and extended forwardly and adapted to connect said bar to a tractor to move on a transverse axis, disc units pivoted to, and extended rearwardly from, said bar, a gang of discs mounted on each unit and adjustable thereon on vertical and horizontal axis, a frame secured to each end of said bar and extended forwardly and a ground wheel rotatably mounted on the forward end of each frame.

5. In a harrow, a transverse bar, a frame whose forward end is connected to the bar to pivot on a transverse axis, an anchor secured to the rear end of each frame, said anchor including a top plate and a depending vertical plate secured to the top plate, an anchor plate secured to the rear end of each frame and having an arcuate slot, said top plate being fitted against the underside of said anchor plate, a clamp secured to said top plate and working through said slot and having clamp means on the upper end thereof to clamp said anchor in a selected position, an inverted U-shaped yoke secured to said vertical plate and adjustable thereon, an axle mounted to rotate in bearings in the free ends of said yoke and a gang of discs on said axle.

6. In a harrow, a transverse bar, a frame whose forward end is pivoted to move on a transverse axis and is supported by said bar and extends rearwardly therefrom, said frame including rearwardly diverging side bars, an H-frame connecting the rear ends of said bars and a plurality of gangs of rotatable cutting discs depending from the rear end of said frame.

7. In a harrow, a frame whose forward end is adapted to be connected to a tractor, a transverse bar supported on said frame, plates clamped to said bar in spaced relation, forward extensions on each of said plates beneath the bar and spaced apart, a plurality of disc units, each unit including side members which diverge rearwardly, the forward ends of said side members extending underneath said bar and being pivoted to the forward ends of the corresponding extensions so as to pivot on horizontal axes and discs carried by the rear ends of the respective units.

SAMUEL J. MILLER.

REFERENCES CITED

The following references are of record in the file of this patent:

UNITED STATES PATENTS

| Number | Name | Date |
| --- | --- | --- |
| 512,708 | Johnson | Jan. 16, 1894 |
| 531,200 | Lindgren | Dec. 18, 1894 |
| 542,470 | Freiburghouse | July 9, 1895 |
| 1,115,839 | Kramer | Nov. 3, 1914 |
| 1,144,151 | Michael | June 22, 1915 |
| 1,162,332 | Buchanan | Nov. 30, 1915 |
| 1,417,971 | Campbell | May 30, 1922 |
| 1,432,143 | White | Oct. 17, 1922 |
| 2,191,537 | Miller | Feb. 27, 1940 |
| 2,344,301 | Hand | Mar. 14, 1944 |
| 2,351,078 | Silver | June 13, 1944 |
| 2,398,147 | McKay | Apr. 9, 1946 |